United States Patent [19]

Suzuki et al.

[11] 4,190,717
[45] Feb. 26, 1980

[54] PROCESS FOR PRODUCING POLYMER FROM QUATERNIZED ACRYLATE MONOMER

[75] Inventors: Naoyuki Suzuki; Yoji Wada; Akihisa Furuno, all of Yokohama; Masao Ishii, Tokyo, all of Japan

[73] Assignees: Nitto Chemical Industry Co., Ltd.; Mitsubishi Rayon Co., Ltd., both of Tokyo, Japan

[21] Appl. No.: 842,157

[22] Filed: Oct. 14, 1977

Related U.S. Application Data

[62] Division of Ser. No. 687,298, May 13, 1976, abandoned.

[30] Foreign Application Priority Data

May 16, 1975 [JP] Japan .................................. 50/57434
May 24, 1975 [JP] Japan .................................. 50/61474

[51] Int. Cl.² .......................... C08F 2/02; C08F 2/16
[52] U.S. Cl. ........................... 526/62; 526/211; 526/287; 526/292; 526/303; 528/502
[58] Field of Search ............ 526/292, 312, 62, 303

[56] References Cited

U.S. PATENT DOCUMENTS

| 2,843,573 | 7/1958 | Melamed | 526/291 |
| 3,661,880 | 5/1972 | Markert | 260/79.3 MU |
| 3,901,857 | 8/1975 | Sackman | 260/79.3 MU |
| 3,948,866 | 4/1976 | Penneswiss | 260/79.3 MU |
| 3,975,341 | 8/1976 | Trapasso | 526/303 |

*Primary Examiner*—C. A. Henderson
*Attorney, Agent, or Firm*—Cushman, Darby & Cushman

[57] ABSTRACT

A process for producing a cationic polymer, which comprises polymerizing a vinyl monomer represented by the general formula,

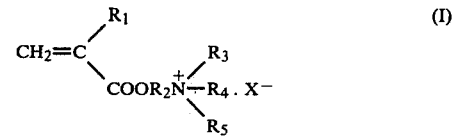

wherein $R_1$ represents —H or —CH$_3$, $R_2$ represents —CH$_2$CH$_2$— or

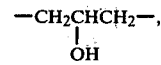

$R_3$ and $R_4$ represent —CH$_3$ or —CH$_2$CH$_3$, $R_5$ represents —C$_n$H$_{2n+1}$, in which n is an integer of 0 to 4,

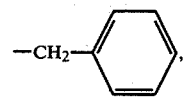

or —CH$_2$COOH, and X$^-$ represents Cl$^-$, CH$_3$SO$_4^-$, CH$_3$SO$_3^-$, or ½ SO$_4^{--}$, either alone or in admixture with up to 25% by weight, based on the total weight of the monomers, of other copolymerizable vinyl monomers in the presence of 7 to 18% by weight, based on the weight of the polymerization system, of water and, if necessary, choline chloride by use of a polymerization initiator and elevating the temperature, in the final polymerization stage, to 110° to 150° C. to complete the polymerization, thereby obtaining the water-soluble cationic polymer in the form of a lump. The polymer in the lump form thus obtained may be easily ground with a high efficiency at room temperature. The powdered polymer is excellent as a cationic flocculant.

28 Claims, No Drawings

PROCESS FOR PRODUCING POLYMER FROM QUATERNIZED ACRYLATE MONOMER

This is a division of application Ser. No. 687,298 filed May 13, 1976 and now abandoned.

This invention relates to a process for producing a cationic polymer and, more particularly, to a process for producing a water-soluble cationic polymer in the form of a lump, from which a powdery polymer can be obtained without drying nor an organic solvent.

A polymer derived from a vinyl monomer represented by the general formula,

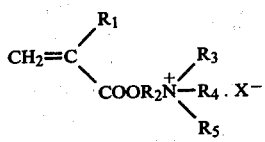  (I)

wherein $R_1$ represents —H or —$CH_3$, $R_2$ represents —$CH_2CH_2$— or

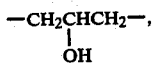

$R_3$ and $R_4$ represent —$CH_3$ or —$CH_2CH_3$, $R_5$ represents —$C_nH_{2n+1}$, in which n is an integer of 0 to 4,

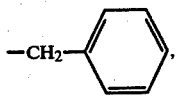

or —$CH_2COOH$, and $X^-$ represents $Cl^-$, $CH_3SO_4^-$, $CH_3SO_3^-$, or $\frac{1}{2} SO_4^{--}$, is known as an excellent cationic flocculant and widely in use as a clarifying agent for domestic and industrial waste water or as a dehydration aid for an organic sludge. It is also used as an auxiliary in paper making, a textile treating agent, and a soil conditioner.

There have heretofore been reported a number of methods for producing cationic polymers. One of the methods comprises polymerizing a monomer in an aqueous solution in such a concentration that the polymerization mixture can still retain fluidity after completion of the polymerization, that is, at a water content of about 70% or more, drying the polymerizate and grinding the dried polymerizate. In another method, the monomer is polymerized in an organic solvent by the technique of precipitation polymerization and then the organic solvent is removed. In still another method, an aqueous solution of the monomer is suspended in an organic solvent and polymerization is carried out by the technique of W/O suspension polymerization, and the resulting polymer is separated from the organic solvent by filtration and then dried.

These methods, however, are not entirely desirable from the industrial standpoint, because they require a drying equipment to remove a large quantity of water, an increased manufacturing expense, or the use of a large amount of an organic solvent associated with the danger of inflammation and explosion.

In order to obtain a powdered polymer advantageously on a commercial scale by a simplified process, with reduced investment, and at a low cost, it is desirable that (1) polymerization is carried out at a concentration as high as possible, so that an after-treatment such as drying is unnecessary, (2) heat removal can easily be effected, because a large amount of heat evolved by the polymerization at a high concentration causes deterioration of the polymer, (3) chemicals having the danger of inflammation and explosion or having toxicity are not employed, (4) the rate of reaction is high, (5) the grindability of the polymer is high, and (6) there can easily be obtained a high molecular weight polymer having excellent solubility, and containing a small amount of the residual monomer.

It is well known that, in general, bulk polymerization of a water-soluble vinyl monomer such as, for example, acrylamide, methacrylamide, acrylic acid, or methacrylic acid generates a large amount of heat, leading to an explosive progress of the polymerization or formation of a completely insoluble polymer.

Almost all vinyl monomers represented by the general formula (I) are crystalline, have generally a high solubility in water and have a relatively low heat of polymerization. For example, dimethylaminoethyl methacrylate hydrochloride has a solubility of about 430 g in 100 g of water at room temperature and a heat of polymerization of about 73 cal./g, and a methyl chloride-quaternized salt of dimethylaminoethyl methacrylate has a solubility of about 460 g in 100 g of water at room temperature and a heat of polymerization of about 67 cal./g.

Owing to these properties, vinyl monomers represented by the general formula (I) may be polymerized at a high concentration. In most of the cases, however, there still remain problems to be solved, such as high residual monomer content, low molecular weight, partially insoluble polymer, or poor grindability unless dried.

The present inventors conducted extensive studies to establish a polymerization process for producing a powdered polymer without drying or use of an organic solvent and, as a result, have found that it is possible to obtain on a commercial scale an easily grindable polymer in the form of a lump having excellent performance characteristics by polymerizing in bulk a vinyl monomer represented by the general formula (I) in the presence of a small amount of water and effecting the final stage polymerization at a temperature of 110° to 150° C.

According to this invention, there is provided a process for producing a cationic polymer, which comprises polymerizing a vinyl monomer represented by the general formula,

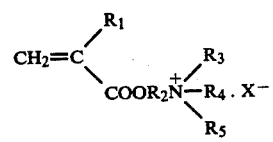  (I)

wherein $R_1$ represents —H or —$CH_3$, $R_2$ represents —$CH_2CH_2$— or

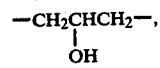

$R_3$ and $R_4$ represent —$CH_3$ or —$CH_2CH_3$, $R_5$ represents —$C_nH_{2n+1}$ in which n is an integer of 0 to 4,

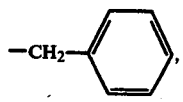

or —CH$_2$COOH, and X$^-$ represents Cl$^-$, CH$_3$SO$_4^-$, CH$_3$SO$_3^-$, or ½ SO$_4^{--}$, either alone or in admixture with up to 25% by weight, based on the total weight of the monomers, of other copolymerizable vinyl monomers by use of a polymerization initiator in the presence of 7 to 18% by weight, based on the weight of the polymerization system, of water and, if necessary, choline chloride and effecting the final stage polymerization at a temperature of 110° to 150° C., thereby obtaining a water-soluble polymer in the form of a lump.

Examples of the monomers represented by the general formula (I) include sulfates, hydrochlorides, di(-lower)alkylsulfates, (lower)alkyl chloride-quaternized salts, chloracetates, and benzyl chloride-quaternized salts of dimethylaminoethyl (meth)acrylate, dimethylaminohydroxypropyl (meth)acrylate, diethylaminoethyl (meth)acrylate, and diethylaminohydroxypropyl (meth)acrylate.

In carrying out the process of this invention, the amount of water added is an important factor for the after-treatment, because it affects greatly the grindability of the polymer. For instance, when samples of a methyl chloride-quaternized salt of dimethylaminoethyl methacrylate with a varying water content were polymerized, the resulting polymers gave the results of impact test as shown in Table 1.

Table 1

| Water content, % by weight | Charpy impact test, kg-cm/cm$^2$ | Test by pulverizer (hammer mill type) |
|---|---|---|
| 25 | >93.6 | x |
| 22.5 | >93.6 | x |
| 20 | 35 | Δ |
| 17.5 | 9.8 | o |
| 15 | 7.6 | o |

Note: -
(1) Charpy impact test was carried out on a testspecimen in the form of a rod, 16.5 mm indiameter, unnotched.
(2) Rating of grindability: x ungrindable; Δ difficult to grind; o easy to grind The grindability is varied depending upon the water content of the polymer, the structure of the polymer, the amount of the remaining monomer in the polymer, and the like. In general, however, when the polymerization is effected at a water content of about 18% by weight or more, the resulting polymer is a tacky gel even at room temperature, and hence, it is difficult to take the polymer out of the polymerization vessel and to grind the polymer. Even if the polymer could be ground, the resulting particles would be adhered to one another, and hence, the desired product could not be obtained.

When the water content in the polymerization system is below 18% by weight, the resulting polymer is satisfactorily grindable and no agglomeration of powder particles takes place. Incomplete polymerization does not result from the presence of monomer crystals which remain undissolved when the water content is not large enough to dissolve all of the monomer crystals, because the remaining crystals dissolve gradually and undergo polymerization owing to the polymerization heat generated in the course of polymerization. However, if the water content is further reduced below 7% by weight, there remain too many monomer crystals for the polymerization system to form a uniform slurry, resulting in such troubles as partial formation of an insoluble polymer or a low-molecular-weight polymer caused by the local accumulation of polymerization heat due to non-uniform polymerization. For example, when crystals of methyl chloride-quaternized salt of dimethylaminoethyl methacrylate are admixed with 6.5% by weight of water and mixed thoroughly, there is obtained neither liquid nor slurry, but a mass of wet, undissolved crystals having attached thereto a solution of the crystal.

In carrying out the process of this invention, the vinyl monomer represented by the general formula (I) can be used together with a limited amount of other copolymerizable monomers. Examples of the copolymerizable monomers include acrylamide, methacrylamide, acrylonitrile, methacrylonitrile, acrylic acid and alkali metal salts thereof, methacrylic acid and its alkali metal salts, methyl acrylate, methyl methacrylate, vinyl acetate, vinylpyridine, and 2-methylvinylpyridine. Since the heat of polymerization per unit weight of these copolymerizable vinyl monomers is two times or more that of the monomer represented by the general formula (I), the joint use of such copolymerizable monomers in large proportions results in difficult control of the polymerization and possible reduction in water-solubility of the resulting polymer. For this reason, when a copolymerizable monomer is jointly used, the amount to be added is preferably about 15%, at most 25%, by weight based on total monomer weight.

Polymerization of the monomer represented by the general formula (I) either alone or in combination with the above-noted other vinyl monomers, according to this invention, can be carried out, if necessary, in the presence of choline chloride,

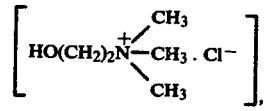

which increases the hardness of the resulting polymer and eventually serves as an extender. Choline chloride can be used as dissolved or suspended in an aqueous solution containing the monomer. The suspended crystals of choline chloride dissolve by absorbing the heat generated by polymerization and such heat absorption favors polymerization by reducing the apparent heat of polymerization, resulting in better temperature control, particularly when a copolymerizable monomer having a large amount of polymerization heat is jointly used. The presence of crystals of choline chloride has substantially no adverse effect on the progress of appropriate polymerization and, on the contrary, is advantageous for the production of a high-molecular-weight cationic polymer containing little residual monomer and excellent in solubility.

The present inventors conducted many experiments to find out whether or not there is any other substance capable of manifesting an effect comparable to that of choline chloride. All of the investigated substances showed adverse effect on the progress of polymerization or on the quality of the polymer or on the grindability of the polymer and no satisfactory substance could be found. Solvents such as, for example, methanol, acetone, acetonitrile, and the like showed foaming during polymerization or presented difficulties in handling owing to the odor or the danger of explosion. Urea, thiourea, and the like adversely affected the polymerization and showed some tendency to reduce the grindability of the polymer. Quaternary ammonium salts such as trimethyldodecylammonium chloride and alkylbenzyldimethylammonium chloride have a surface activity and gave a polymer having undesirable foaming tendency when dissolved in water. Dimethylethanolamine hydrochloride presented a problem in respect of odor and showed a tendency not only to decrease the molecular weight but also to increase the residual monomer content in the polymer. Hydroquinones, cupferron, phenothiazine, EDTA and the like may only be used in a small amount as a polymerization modifier.

The amount of choline chloride used in the present process for the above-noted purposes is, although not critical, 50% by weight or less, preferably 3 to 20% by weight based on the total weight of the monomer represented by the general formula (I) and other copolymerizable monomers. If choline chloride is used in excess of 50% by weight, the cationic polymer tends to become unsatisfactory in conversion, residual monomer content, and molecular weight.

In carrying out the present process, it is desirable for the production of a cationic polymer of desirable properties with a high reproducibility to control adequately the pH of the polymerization system. When the pH is kept within the range from 3 to 8, as measured by means of a customary glass electrode, the rate of polymerization is sufficiently high and a polymer having satisfactory solubility is obtained. If the pH is larger than 8, polymerization proceeds with difficulty and an insoluble polymer tends to result. It is also undesirable to lower the pH below 3, because the polymerization is difficult to complete and a high-molecular-weight polymer is difficult to obtain. Therefore, such pH values are not desirable.

The polymerization according to this invention is effected most suitably by use of a bulk polymerization technique under adiabatic conditions. The polymerization vessel may be any of those used in customary bulk polymerization, but is preferably provided with coating or lining of release materials on the interior wall in order to facilitate the discharge of the polymerizate after completion of polymerization. The term "release materials" used herein means to include coating materials such as Teflon and related substances having well-known release property, lining materials such as polyester, polypropylene, or a combination thereof, and other coating or lining materials selected from substances customarily used as release agents. For polymerization, it is also possible to use, besides ordinary vessels, a bag made of polyester film, laminated polypropylene-polyester film, or similar materials.

The monomer represented by the general formula (I) is polymerized in the above-noted polymerization vessel by using, as a polymerization initiator, a combination of a reducing agent such as Rongalite, a ferrous salt, ascorbic acid, or a sulfite and a peroxide such as hydrogen peroxide, an alkali metal persulfate, or tert.-butyl hydroperoxide, and, if necessary, a water-soluble azo compound. The initial polymerization temperature is regulated so that the temperature of the polymerizate may become 110° to 150° C. in the final stage of polymerization.

As described in Examples 7 and 8 which will appear hereinafter, in the case where polymerization is effected by using a polymerization vessel which produces final polymerizate in the form of a sheet (or plate) and which is immersed in a heated medium, there may be used, besides the above-noted combined initiator, a peroxide alone or a water-soluble azo compound alone at a suitable polymerization temperature depending on the initiator used. In this case, since the exterior temperature of the vessel is generally 30° to 100° C., it is necessary to complete the polymerization by heating the vessel to 110° to 150° C. in the final stage of polymerization. The polymerization vessel is maintained desirably at this temperature for at least about three minutes. The residual monomer content of the polymerizate is effectively reduced by such a treatment.

It is one of the features of this invention that although polymerization is allowed to proceed in the presence of water, the polymerization system shows little foaming even when heated to 150° C. under atmospheric pressure and polymerization proceeds until completion. However, if the polymerization system in the final stage is exposed to a temperature exceeding 150° C., violent foaming will take place and the polymerizate tends to become insoluble, while if the polymerization temperature in the final stage is below 110° C., the residual monomer content of the polymerizate tends to increase particularly when polymerization is carried out in the presence of a crystalline monomer, a portion of which will remain undissolved and, hence, unreacted. A high residual monomer content is undesirable, because the grindability of the polymerizate becomes inferior.

The molecular weight of the polymer can be regulated either by the amount of initiator used or by the addition of up to about 0.5% by weight of mercaptans such as, for example, $\beta$-mercaptoethanol, $\beta$-mercaptopropionic acid, thioglycolic acid, and the like. Since these mercaptans markedly accelerate the polymerization, they may be used as a reducing component of the initiator. It is desirable for the reproducibility of the progress of polymerization to carry out polymerization under exclusion of oxygen by deaeration or replacement with nitrogen or by any other treatment.

Since the polymerization mixture is maintained at 110° to 150° C. in the final stage of polymerization, the polymerizate is sufficiently soft to cut with a tool provided with a sharp edge. When cooled, the soft polymer turns into a glassy solid which is brittle enough to be crushed. Although the temperature at which the polymer transforms into a glassy brittle solid depends on water content, structure, and residual monomer content of the polymer and cannot be generalized, the polymer obtained under the conditions as herein specified is sufficiently brittle to be ground at room temperature. A polymer with a higher water content is grindable when cooled to a temperature of 0° C. for example, but the powdered polymer tends to agglomerate when brought to room temperature. The finely ground polymer of the desired water content may be packed as such in a bag to be ready for shipping. According to this invention, the polymer is obtained in a high yield, because the loss in polymer is only that caused by scattering during the crushing, the grinding and the packaging, which amounts to 0.1% at most.

As mentioned above, according to this invention, there is obtained from the monomer represented by the general formula (I) a powdered cationic polymer which is easily soluble in water and excellent in performance characteristics as a dehydrating aid for organic sludges or as a clarifying agent for sewage and industrial waste water.

This invention is illustrated below in further detail with reference to Examples, but the invention is not limited thereto.

EXAMPLE 1

To 10 kg of an aqueous solution of a sulfate of dimethylaminoethyl methacrylate (water content: 15% by weight) having a pH of 6 and being maintained at 18.5° C., were added 0.2 g of L-ascorbic acid and 0.25 g of potassium persulfate. The resulting solution was placed in a 13-liter thermos jar coated with Teflon, and nitrogen was passed through the solution for five minutes. Thereafter, the solution was allowed to stand to allow adiabatic polymerization to proceed. The polymerization started 15 minutes after the addition of initiator and 44 minutes had elapsed before the maximum temperature of 120° C. was attained. The polymerization system was maintained at this temperature for one hour. The resulting polymer was rubbery with a slight flexibility and converted to a very brittle solid when cooled to a temperature of 48° C. or lower. The cooled polymer was crushed by means of a jaw crusher to pieces about 5 cm in maximum diameter. The pieces were further ground by means of a pulverizing mill of the hammer mill type to obtain a powdered polymer, 1 mm in mean average particle diameter. The powdered polymer showed a good solubility and a 1% by weight aqueous solution having a Brookfield viscosity of 500 cp was obtained in less than three hours. The residual monomer content of the polymer was 0.8% by weight, as measured by the method of UV absorption. There was no loss during the polymerization. However, the loss resulting from scattering during the crushing, grinding and packaging was several grams. The overall yield was about 99.95% by weight.

EXAMPLE 2

In 1.5 kg of water was dissolved at 60° C. 8.2 kg of a hydrochloride of dimethylaminoethyl methacrylate. The resulting homogeneous solution was admixed with 2 cc of 12 N hydrochloric acid to adjust the pH to 5.0 and then cooled to 30° C., whereby a portion of the hydrochloride of dimethylaminoethyl methacrylate precipitated in the crystalline form. This solution containing precipitated crystals was deaerated for 15 minutes while having been subjected to a vacuum of 25 mmHg. Thereafter, the solution was admixed with 0.3 kg of methyl acrylate, 0.10 g of β-mercaptoethanol, and 0.15 g of hydrogen peroxide and transferred into a bag made of a polyester film. The bag was tightly sealed and placed in a polymerization vessel provided with a temperature control device. The temperature of the polymerization vessel was continually regulated so that the exterior temperature of the bag was always the same as the temperature of polymerization mixture. In this way, adiabatic polymerization started 25 minutes after the addition of the initiator and 66 minutes elapsed before the maximum temperature of 140° C. was attained. The polymerization mixture was maintained at this temperature for 30 minutes. The resulting polymer at this temperature was rubbery and had a slight flexibility. After having been cooled to a temperature lower than 45° C., the polymer was pulverized in the same manner as in Example 1 to obtain a powdered polymer. This polymer was more soluble than that obtained in Example 1 and a 1% by weight aqueous solution having a Brookfield viscosity of 7,000 cp was obtained in 2 hours. The residual monomer content was 0.55% by weight.

COMPARATIVE EXAMPLE

To 0.6 kg of water was added 9.4 kg of a methyl chloride-quaternized salt of dimethylaminoethyl methacrylate and thoroughly mixed. The resulting mixture was not a slurry but a mass of wet, undissolved crystals having attached thereto an aqueous solution of the monomer adhered thereon. To the wet crystals were added 0.01% by weight of L-ascorbic acid [in the form of a 10% by weight aqueous solution], 0.005% by weight of 2,2'-azobis(2-amidinopropane) hydrochloride [in the form of a 10% by weight aqueous solution], and 0.001% by weight of hydrogen peroxide [in the form of a 30% by weight aqueous solution]. The resulting mixture was thoroughly blended and transferred into a bag made of a polyester film. The bag was tightly sealed and the mixture in the bag was allowed to polymerize at 20° C. Although apparently uniform progress of the polymerization was observed at the start, the maximum temperature varied from part to part of the polymerization system; conversion was 50% at one location and 80% at another; the Brookfield viscosity was also varied between about 50 cp and about 2,000 cp. Thus, the polymerization was found to be non-uniform. Overall yield, 99.93% by weight.

EXAMPLE 3

To 1 kg of an aqueous solution of a methyl chloride-quaternized salt of dimethylaminoethyl methacrylate (water content: 17.5% by weight) was added 121 g of crystalline choline chloride and mixed thoroughly. To the resulting mixture having a pH of 7.0 were added 0.02 g of L-ascorbic acid and 0.025 g of potassium persulfate. Then the mixture was heated to 30° C. and placed in a Teflon-coated 1.3-liter thermos jar, into which a nitrogen stream was introduced to keep the crystals of choline chloride from settling. When the commencement of polymerization was ascertained, the nitrogen stream was interrupted and adiabatic polymerization was allowed to proceed. The commencement of polymerization was noticed 15 minutes after the addition of initiator. The time elapsed before the maximum temperature of 118° C. was attained was 40 minutes.

After having been cooled to room temperature, the polymerizate was crushed to pieces, about 3×3 cm in size, and further ground by means of a pulverizing mill of the hammer mill type to obtain a powdered cationic polymer. This polymer showed good dissolvability; the Brookfield viscosity of a 1% by weight aqueous solution was 3,000 cp; the residual monomer content of the polymer was 0.8% by weight, as measured by UV absorption.

EXAMPLE 4

A series of mixtures were prepared by adding varying amounts of choline chloride, as shown in Table 2, to an aqueous solution containing 75% by weight of dimethylaminoethyl methacrylate hydrochloride and 8% by weight of acrylamide (water content: 17% by weight). To each mixture, after adjusting the pH to 6.0, were added 0.003% by weight (based on polymerization mixture) of Rongalite and 0.005% by weight (based on polymerization mixture) of tert.-butyl hydroperoxide. Polymerization and grinding of the polymerizate were carried out by following the procedure of Example 1. The results obtained were as shown in Table 2.

Table 2

| Amount of choline chloride (wt. % based on total weight of monomers) | Temperature profile of polymerization | | | Grindability of polymer* | Evaluation of powdered polymer | | |
|---|---|---|---|---|---|---|---|
| | Induction period (min.) | Polymerization peak | | | Brookfield viscosity of 1% aq. solution (cp) | Residual monomer (%) | Dissolvability |
| | | Duration (min.) | Temp. (°C.) | | | | |
| 0 | 18 | 66 | 153 | Poor | 1,950 | 3.2 | Some insolubles |
| 18 | 16 | 55 | 140 | Good | 2,900 | 0.5 | Good |
| 36 | 16 | 54 | 128 | " | 3,200 | 0.4 | " |
| 54 | 15 | 50 | 118 | Poor | 3,000 | 1.0 | " |

Note: -
*Grindability at room temperature. The rating "poor" was assigned to such a polymer which showed a tendency to agglomerate during grinding.

EXAMPLE 5

A monomer slurry comprising 85% by weight of a methyl chloride-quaternized salt of dimethylaminoethyl methacrylate and 15% by weight of deionized water was adjusted to a pH of 6.0 and deaerated under a reduced pressure of 10 mmHg for 10 minutes. To each portion of the slurry maintained at varying temperatures, as shown in Table 3, were added 0.01% by weight of L-ascorbic acid, 0.005% by weight of 2,2'-azobis(2-amidinopropane) hydrochloride, and 0.001% by weight of hydrogen peroxide. Each slurry was thoroughly mixed and subjected to adiabatic polymerization in the same manner as in Example 1. After the maximum temperature was reached, the polymerization mixture was kept at this temperature to allow the mixture to ripen. The results obtained were as shown in Table 3.

Table 3

| Run No. | Temperature profile of polymerization | | | | | Grindability of polymer* | Evaluation of polymer | | | Appearance of polymer after completion of polymerization |
|---|---|---|---|---|---|---|---|---|---|---|
| | Initial temp. of polymerization (°C.) | Induction period (min.) | Max. temperature (°C.) | Time required to reach max. temp. (min.) | Duration of ripening (min.) | | Viscosity of 1% aq. solution (cp) | Residual monomer content (%) | Dissolvability | |
| 1 | 0 | 120 | 80 | 230 | 60 | Poor | 4,000 | 20 | Good | Cloudy with monomer crystals |
| 2 | 10 | 30 | 100 | 80 | " | " | 5,500 | 6 | " | Colorless, clear |
| 3 | 20 | 10 | 121 | 35 | " | Good | 6,000 | 0.8 | " | Colorless, clear |
| 4 | 36 | 5 | 140 | 21 | " | " | 5,700 | 1.0 | " | Colorless, clear |
| 5 | 60 | 2 | 155 | 8 | " | Poor | 2,000 | 10 | Some insolubles | Marked foaming |

Note:-
*cf. Note to Table 2.

EXAMPLE 6

A series of experiments were run under the same conditions as in Example 5, Run No. 3, except that the pH of the polymerization mixture was varied, to examine the effect of pH on the progress of polymerization and the properties of the polymerizate. The results obtained were as shown in Table 4.

Table 4

| Run No. | pH | Temperature profile of polymerization | | | | Grindability of polymer* | Evaluation of polymer | | | Appearance of polymer after completion of polymerization |
|---|---|---|---|---|---|---|---|---|---|---|
| | | Induction period (min.) | Max. temperature (°C.) | Time required to reach max. temp. (min.) | Duration of ripening (min.) | | Viscosity of 1% aq. solution (cp) | Residual monomer content (%) | Dissolvability | |
| 1 | 2 | 6 | 116 | 25 | 60 | Poor | 4,000 | 4.3 | Good | Colorless, clear |
| 2 | 4 | 10 | 121 | 33 | " | Good | 6,000 | 0.9 | " | Colorless, clear |
| 3 | 6 | 10 | 121 | 35 | " | " | 6,000 | 0.8 | " | Colorless, clear |
| 4 | 7.5 | 20 | 121 | 60 | " | " | 6,000 | 1.0 | " | Colorless, clear |
| 5 | 9 | 245 | 120 | 425 | " | " | — | — | Not dissolved | Colorless, clear |
| 6 | 9.5 | Unpolymerizable | | | | | — | — | — | — |

Note:
*cf. Note to Table 2.

EXAMPLE 7

To 1 kg of an aqueous solution (pH 5) of a benzyl chloride-quaternized salt of dimethylaminoethyl methacrylate (water content: 10% by weight) was added 0.2 g of 2,2'-azobis(2-amidinopropane) hydrochloride. The resulting solution was introduced into a cell composed of two parallel Teflon-coated stainless steel sheets and a polyvinyl chloride tubing, 1.5 cm in outer diameter, placed between said two steel sheets and along the edges, said two steel sheets having been clamped together to make them 1 cm apart. The cell was then closed tightly and immersed in a water bath at 60° C. to allow the polymerization to proceed. Two hours after the commencement of the polymerization, a maximum temperature of 67° C. was reached and the polymerization was continued at this temperature for a further one hour. Then, the cell was withdrawn from the water bath and subjected to heat treatment in a thermostat at 125° C. for one hour to complete the polymerization.

The polymerizate was a sheet which showed no brittleness immediately after having been taken out of the thermostat. When cooled to room temperature, the polymerizate became very brittle and easily grindable. The polymerizate was ground by means of a pulverizing mill of the hammer type to obtain a powdered product, which showed very good dissolvability. The Brookfield viscosity of a 1% by weight aqueous solution of this polymer was 4,000 cp. Overall yield, 99.1% by weight.

EXAMPLE 8

To 1 kg of an aqueous solution (pH 5) of a methyl chloride-quaternized salt of dimethylaminoethyl methacrylate (water content: 8% by weight) was added 0.2 g of 2,2'-azobis(2-amidinopropane) hydrochloride. The resulting solution was introduced into the same cell as used in Example 7. The cell was closed tightly and immersed in a water bath at 70° C. to allow the polymerization to proceed. Fifty five minutes after the beginning of polymerization, a maximum temperature of 81° C. was reached and the polymerization was continued at this temperature for a further one hour. Then the cell was taken out of the water bath and subjected to heat treatment in a thermostat at 125° C. for one hour.

The polymer thus obtained was a hard sheet. After having been cooled to room temperature, the polymer sheet was ground by means of a pulverizing mill of the hammer mill type to obtain a powdered polymer. The Brookfield viscosity of a 1% by weight aqueous solution of this polymer was 5,500 cp. The residual monomer content of this polymer was 1.5%.

EXAMPLE 9

A mixture of 8.3 kg of a methyl chloride-quaternized compound of dimethylaminoethyl methacrylate, 0.4 kg of acrylamide, and 1.3 kg of water was heated to 70° C. to form a homogeneous solution. The solution was cooled to 21° C. and the pH was adjusted to 6.0 by adding 3 cc of 12 N hydrochloric acid. The resulting solution containing monomer crystals, which were precipitated during cooling, was deaerated at a subatmospheric pressure of 25 mmHg for 15 minutes and thereafter admixed with 0.15 g of Rongalite, 0.1 g of hydrogen peroxide, and 0.2 g of 2,2'-azobis(2-amidinopropane) hydrochloride. The resulting mixture was polymerized in the same manner as in Example 2. The time required to reach a maximum temperature of 141° C. was 48 minutes after the addition of initiator. The polymerization mixture was kept at this temperature for a further 30 minutes.

The polymer thus obtained was a slightly flexible solid which became brittle when cooled below 79° C. The cooled polymer was ground in the same manner as in Example 1 to yield a powdered product which had a residual monomer content of 0.6% by weight and showed very good dissolvability. The Brookfield viscosity of a 1% by weight aqueous solution was 5,200 cp.

EXAMPLE 10

To 10 kg of an aqueous slurry of a methyl chloride-quaternized salt of dimethylamino-2-hydroxypropyl methacrylate (water content: 13% by weight) having a pH of 3.5 and maintained at 25° C. were added 0.3 g of Rongalite, 0.3 g of potassium persulfate and 0.5 g of 2,2'-azobis(2-amidinopropane) hydrochloride.

The slurry was subjected to adiabatic polymerization in the same manner as in Example 1.

The polymerization started 20 minutes after the addition of the initiator and 38 minutes had elapsed before the maximum temperature of 115° C. was attained. The polymerization mixture was maintained at this temperature for 60 minutes.

The resulting polymer was cooled and then crushed in the same manner as in Example 1. The powdered polymer showed a good solubility and a 1% by weight aqueous solution having a viscosity of 5,700 cp was obtained in less than two hours.

The residual monomer content of the polymer was 0.7% by weight, as measured by the method of UV absorption. Overall yield, 99.92%.

EXAMPLE 11

To 10 kg of an aqueous slurry consisting of 82% by weight of a methyl chloride-quaternized salt of dimethylaminoethyl acrylate, 8% by weight of choline chloride and 10% by weight of water, having a pH of 5.0 and maintained at 30° C. were added 0.2 g of L-ascorbic acid and 0.25 g of potassium persulfate.

The slurry was subjected to polymerization in the same manner as Example 1.

The polymerization started 15 minutes after the addition of the initiator and 42 minutes had elapsed before the maximum temperature of 130° C. was attained.

The polymerization mixture was maintained at this temperature for 60 minutes.

The resulting polymer was cooled and then crushed in the same manner as in Example 1.

The powdered polymer showed a good solubility and a 1% by weight aqueous solution having a viscosity of 5,300 cp was obtained in less than two hours.

The residual monomer content of the polymer was 0.4% by weight, as measured by the method of UV absorption.

What is claimed is:

1. A process for producing a cationic polymer, which consists essentially of polymerizing in bulk a vinyl monomer represented by the general formula,

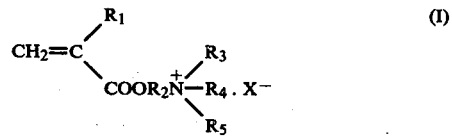
(I)

wherein $R_1$ represents —H or —CH$_3$; $R_2$ represents —CH$_2$CH$_2$— or $$-CH_2\underset{\underset{OH}{|}}{C}HCH_2-;$$

$R_3$ and $R_4$ represent —CH$_3$ or —CH$_2$CH$_3$; $R_5$ represents —C$_n$H$_{2n+1}$ in which n is an integer from 0 to 4,

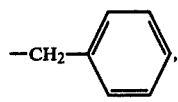, or —CH$_2$COOH; and X$^-$ represents Cl$^-$, CH$_3$SO$_4^-$, CH$_3$SO$_3^-$, or ½ SO$_4^{--}$, either alone or in admixture with up to 25% by weight, based on the total weight of the monomers, of other polymerizable vinyl monomers by use of polymerization initiator in the presence of 7 to 18% by weight, based on the weight of the polymerization system, of water, in the presence of crystals of the monomer (I), effecting the final stage of the polymerization at 110° to 150° C., thereby obtaining the water-soluble cationic polymer in the form of a lump.

2. A process according to claim 1 wherein the vinyl compound represented by the general formula (I) is polymerized alone.

3. A process according to claim 1, wherein the water soluble cationic polymer in the form of a lump is ripened at a temperature of 110° to 150° C. for a period of 3 minutes or more.

4. A process according to claim 2 wherein $R_1$ is methyl.

5. A process according to claim 1, wherein the vinyl compound represented by the general formula is selected from the group consisting of sulfates, hydrochlorides, di-lower-alkylsulfates, lower-alkyl chloridequaternized salts, chloracetates and benzyl chloridequaternized salts of dimethylaminoethyl acrylate, dimethylaminoethyl methacrylate, dimethylaminohydroxypropyl acrylate, dimethylaminohydroxypropyl methacrylate, diethylaminoethyl acrylate, diethylaminoethyl methacrylate. diethylaminohydroxypropyl acrylate and diethylaminohydroxypropyl methacrylate.

6. A process according to claim 1, wherein the vinyl monomer represented by the general formula is selected from the group consisting of dimethylaminoethyl methacrylate sulfate, dimethylaminoethyl methacrylate hydrochloride, methyl chloride-quaternized salt of dimethylaminoethyl methacrylate, methyl chloride-quaternized salt of dimethylaminohydroxypropyl methacrylate, methyl chloridequaternized salt of dimethylaminoethyl acrylate, and benzyl chloride-quaternized salt of dimethylaminoethyl methacrylate.

7. A process according to claim 1, wherein the polymerization is initiated by a redox-type initiator and/or a water-soluble azo-type initiator.

8. A process according to claim 1, wherein the said other copolymerizable vinyl monomers are at least one monomer selected from the group consisting of acrylonitrile, methacrylonitrile, acrylamide, methacrylamide, acrylic acid, methacrylic acid, methyl acrylate, methyl methacrylate, vinyl acetate, vinylpyridine and 2-methylvinylpyridine, and is used in an amount of 25% by weight or less, based on the total weight of the monomers.

9. A process according to claim 1, wherein the pH of the polymerization system is adjusted to 3 to 8.

10. A process according to claim 1, wherein a polymerization vessel in which the inner wall is coated or lined with a release material is used.

11. A process according to claim 1, wherein the polymerization is carried out in a bag made of polyester film or laminated polyester-polypropylene film.

12. A process according to claim 1 wherein in the vinyl monomer of formula (I) $R_1$ is methyl.

13. A process according to claim 12 where $R_2$ is —CH$_2$CH$_2$—, $R_3$ and $R_4$ are methyl and $R_5$ is hydrogen.

14. A process according to claim 12 wherein $R_2$ is —CH$_2$CH$_2$— and $R_3$, $R_4$ and $R_5$ are methyl.

15. A process according to claim 12 wherein $R_2$ is —CH$_2$CH$_2$—, $R_3$ and $R_4$ are methyl and $R_5$ is benzyl.

16. A process according to claim 12 wherein $R_2$ is $$-CH_2\underset{\underset{OH}{|}}{C}HCH_2$$

and $R_3$, $R_4$ and $R_5$ are methyl.

17. A process according to claim 8 wherein said other monomer is used in an amount of 15% by weight or less based on the total weight of the monomers.

18. A process according to claim 2 wherein the water soluble cationic polymer in the form of a lump is ripened at a temperature of 110° to 150° C. for a period of 3 minutes or more.

19. A process according to claim 2 wherein the vinyl compound represented by the general formula (I) is selected from the group consisting of sulfates, hydrochlorides, di-lower-alkylsulfates, lower-alkyl chloridequaternized salts, chloracetates and benzyl chloridequaternized salts of dimethylaminoethyl acrylate, dimethylaminoethyl methacrylate, dimethylaminohydroxypropyl acrylate, dimethylaminohydroxypropyl methacrylate, diethylaminohydroxypropyl acrylate and diethylaminohydroxypropyl methacrylate.

20. A process according to claim 2 wherein the vinyl monomer represented by the general formula (I) is selected from the group consisting of dimethylaminoethyl methacrylate sulfate, dimethylaminoethyl methacrylate hydrochloride, methyl chloride-quaternized salt of dimethylaminoethyl methacrylate, methyl chloride-quaternized salt of dimethylaminohydroxypropyl methacrylate, methyl chloride-quaternized salt of dimethylaminoethyl acrylate, and benzyl chloride-quaternized salt of dimethylaminoethyl methacrylate.

21. A process according to claim 2 wherein the polymerization is initiated by a redox-type initiator and/or a water-soluble azo-type initiator.

22. A process according to claim 4 wherein $R_2$ is —CH$_2$CH$_2$—, $R_3$ and $R_4$ are methyl and $R_5$ is hydrogen.

23. A process according to claim 1 wherein the pH of the polymerization system is adjusted to 3 to 8.

24. A process according to claim 2 wherein a polymerization vessel in which the inner wall is coated or lined with a release material is used.

25. A process according to claim 2 wherein the polymerization is carried out in a bag made of polyester film or laminated polyester-polypropylene film.

26. A process according to claim 4 wherein $R_2$ is —CH$_2$CH$_2$— and $R_3$, $R_4$ and $R_5$ are all methyl.

27. A process according to claim 4 wherein $R_2$ is —CH$_2$CH$_2$—, $R_3$ and $R_4$ are methyl and $R_5$ is benzyl.

28. A process according to claim 4 wherein $R_2$ is $$-CH_2\underset{\underset{OH}{|}}{C}HCH_2-$$

and $R_3$, $R_4$ and $R_5$ are all methyl.

* * * * *